May 25, 1954 R. D. H. WRIGHT 2,679,448

TIME RECORDER

Filed Aug. 2, 1950 4 Sheets-Sheet 1

Inventor
Robert David Henry Wright
By Mawhinney & Mawhinney
Attorneys

May 25, 1954 R. D. H. WRIGHT 2,679,448

TIME RECORDER

Filed Aug. 2, 1950 4 Sheets-Sheet 2

Inventor
Robert David Henry Wright
By Harris & Ohlemann
Attorneys

May 25, 1954 | R. D. H. WRIGHT | 2,679,448

TIME RECORDER

Filed Aug. 2, 1950 | 4 Sheets-Sheet 3

*Inventor*

Robert David Henry Wright

By Francis L. Otteman

*Attorneys*

May 25, 1954

R. D. H. WRIGHT

TIME RECORDER 2,679,448

Filed Aug. 2, 1950

4 Sheets-Sheet 4

Inventor

Robert David Henry Wright

By Harris & Patterson

Attorneys

Patented May 25, 1954 2,679,448

UNITED STATES PATENT OFFICE 2,679,448

TIME RECORDER

Robert David Henry Wright, Dorking, Surrey, England, assignor to The British Vacuum Cleaner and Engineering Company Limited, Leatherhead, England, a British company Application August 2, 1950, Serial No. 177,301

9 Claims. (Cl. 346—82)

This invention relates to time recorders and to that type of device in which a printed time record is stamped on a card inserted therein, such printed record providing the basis of payment between employer and employee.

The invention aims at producing an improved time recorder of the kind above indicated, the construction and operation of which will be simplified in comparison with known types of time recorders, and which will enable a record card to be automatically and instantaneously aligned and stamped upon insertion of a card in the recorder, such latter operation requiring the use of one hand only, and thereby enabling the maximum number of individually presented cards to be printed within the minimum space of time.

During the operation of a time recorder a number of operations (herein referred to as the "program") have to be carried out, at predetermined periods; thus, provision has to be made for effecting a horizontal shift and a vertical shift of the printed record on the record card to denote a change from one day to another, or from morning to afternoon. Similarly, it is necessary to provide for a change in the colour of the record printed on the card, in order to indicate a change from one working period to another, or to indicate an "early" or "late" recording before or after any given time. It is also convenient to provide for the operation of signalling apparatus or the like at predetermined time or periods during the normal working period.

A further object of the invention is to provide an improved and simplified means for furnishing a program adequate for a wide variety of different requirements and for the adjustment of the program in a simple and expeditious manner to meet changes in such requirements.

According to the invention a time recorder is provided wherein the means for setting and operating the program comprises one or more discs adapted to be rotated at a constant speed and arranged to carry a number of trip members, a series of levers one end of each of which constitutes an actuating member for imparting impulses to a section of the program mechanism, and the other end of each of which constitutes a cam follower, a series of cams adapted to be rotated in timed relationship with said discs and adapted to engage the follower ends of said levers to create pivotal movements thereof so as to impart impulses to said sections of said program mechanism by the actuating ends of said levers, and latch members for holding said levers out of contact with said cams but adapted to be released by said trips on rotation of said discs to free said levers for actuation by said cams to operate the program.

Figure 1:
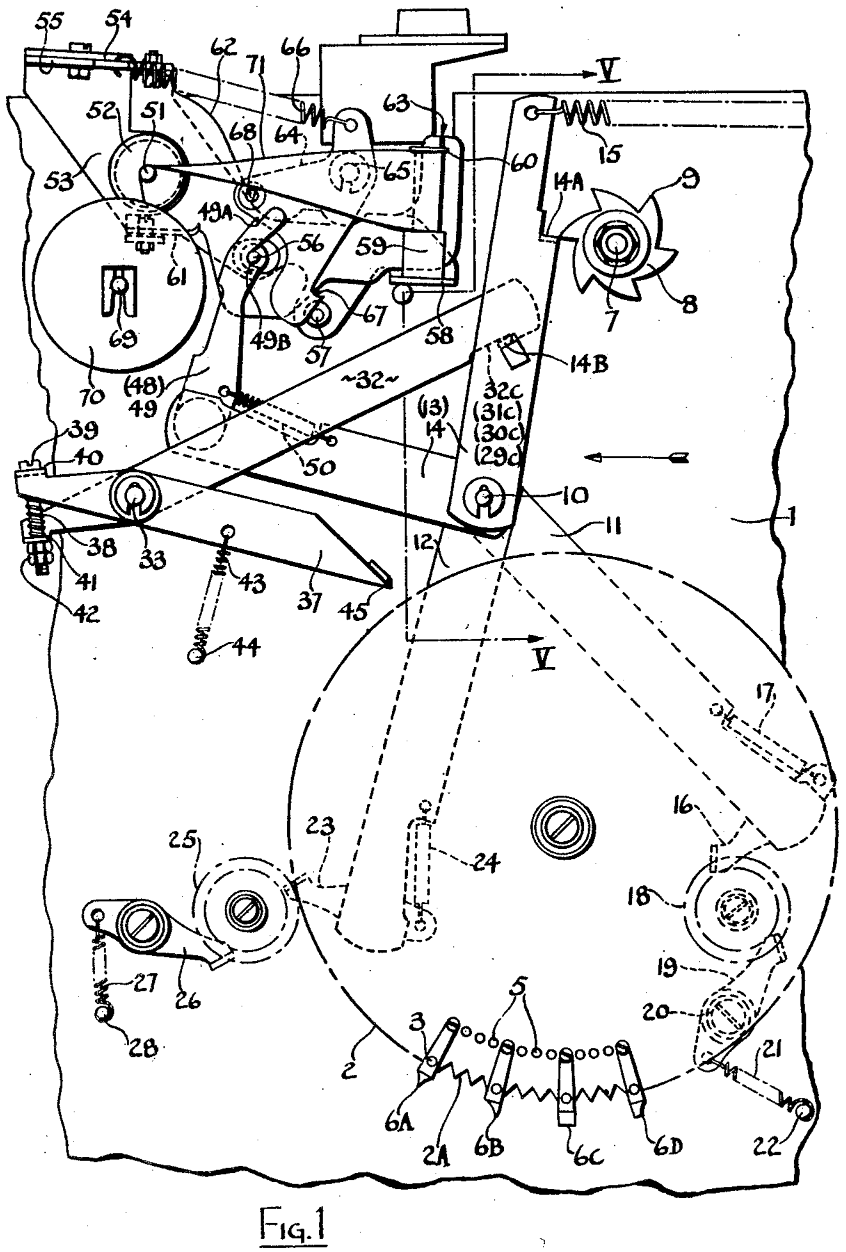
Figure 2:
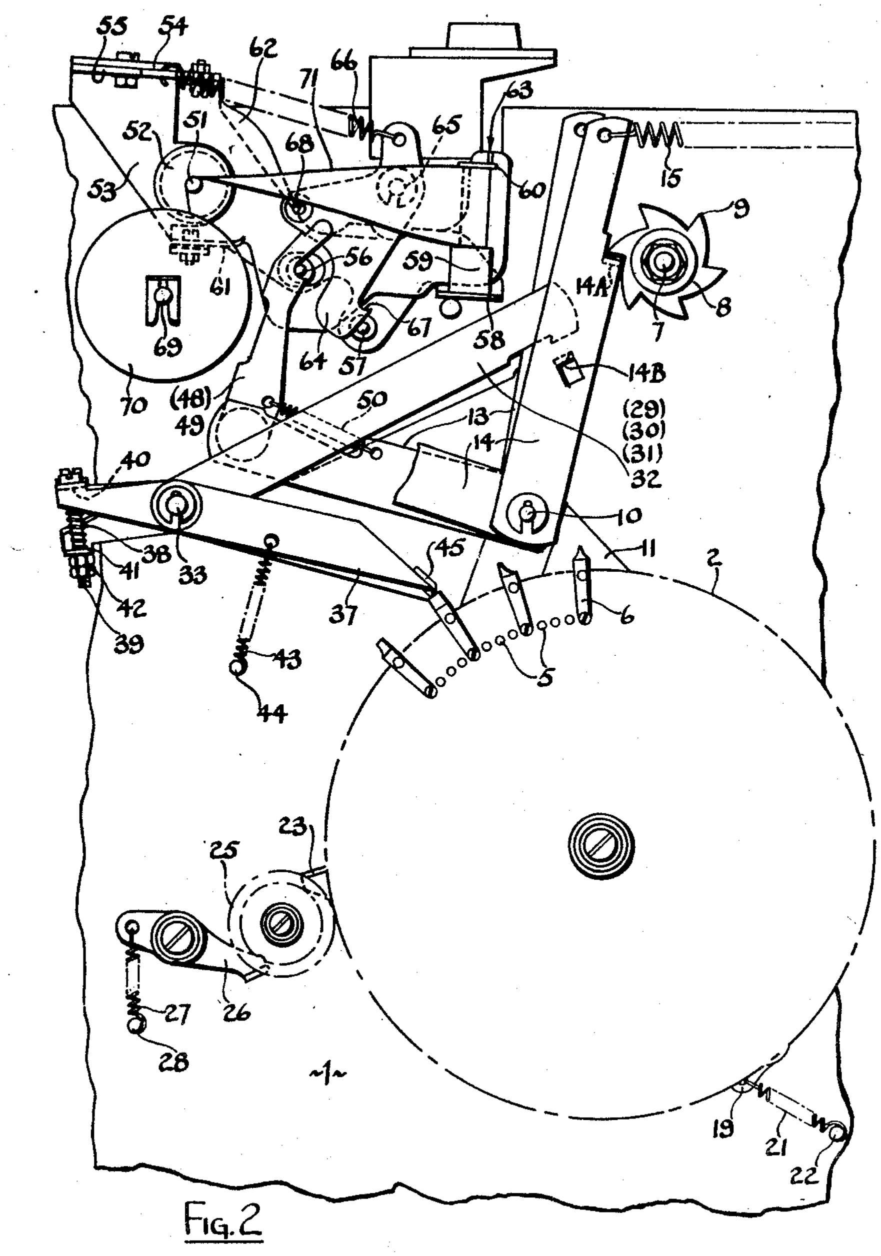
Figure 3:
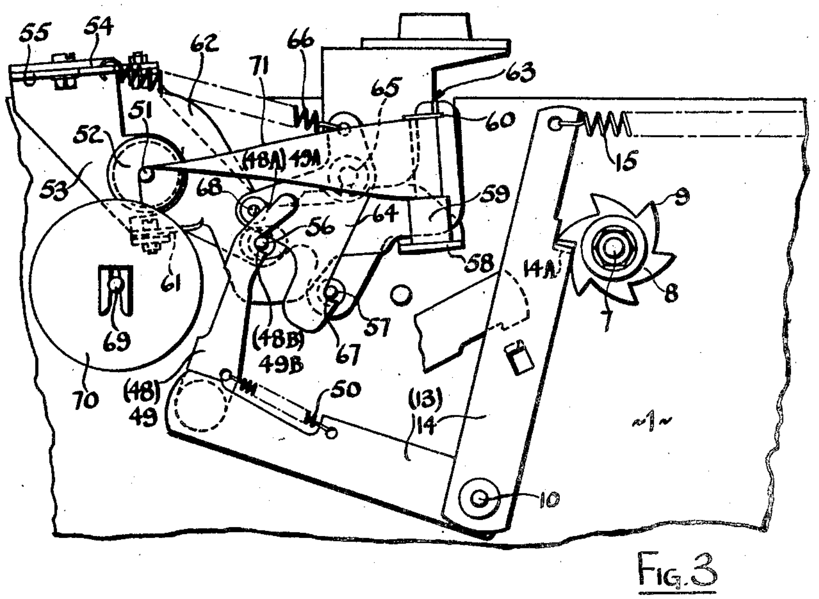
Figure 4:
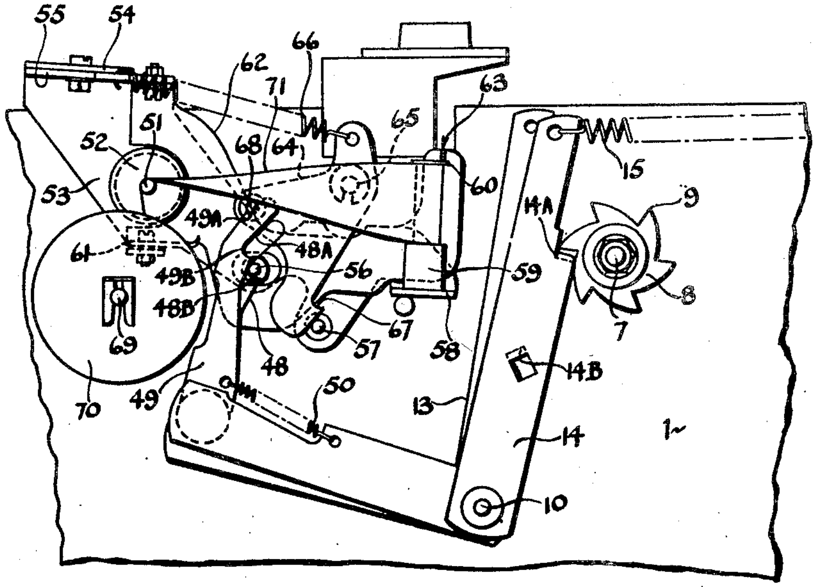
Figure 5:
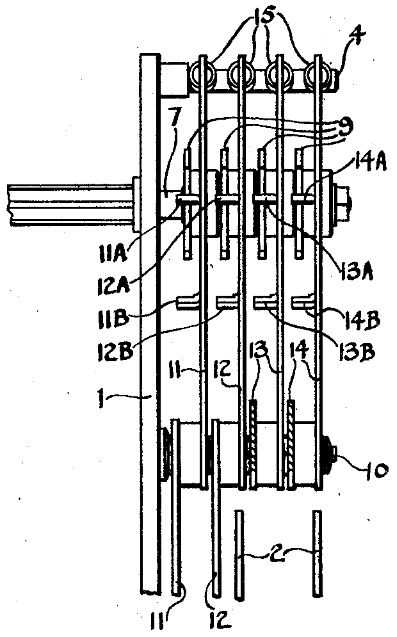
Figure 6:
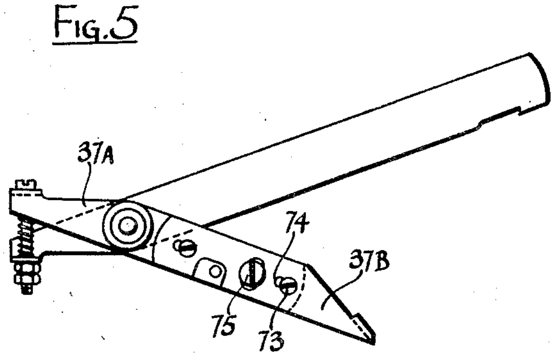

Reference will now be made to the accompanying drawings which illustrate a preferred form of construction according to the invention and in which Fig. 1 is a side elevation of the program setting and operating mechanism of a time recorder, Fig. 2 is a view similar to Fig. 1 showing a trip member of the program mechanism in an operative condition, Fig. 3 is a side elevation of a part of the program mechanism actuating the ribbon colour change device, in one operative condition thereof, Fig. 4 is a view similar to Fig. 3 in a further stage of operation, Fig. 5 is a part sectional view on the line V—V of Fig. 1, and Fig. 6 is a detail view of a modified form of a latch lever and latch release lever shown in Figs. 1 to 4.

Figure 7:
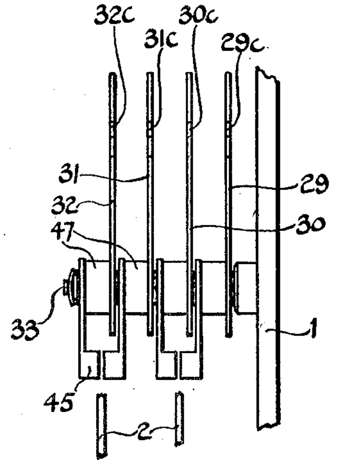

Fig. 7 is a detail view, showing the arrangement of these latch and latch release members, as seen in the direction of the arrow on Fig. 1.

In the drawings certain parts have been omitted from some views (notably Figs. 3 and 4) for the sake of clarity and to facilitate the reading of the drawings in conjunction with the description of the apparatus and its operation.

Referring first to Fig. 1 it will be seen that the program mechanism is arranged externally of a side plate 1 of the time recorder. Two program discs 2 (Figs. 1 and 5) are secured on a shaft mounted in the side plates 1 and are adapted to be rotated once in every 24 hours. Each program disc 2 is formed on its periphery with a series of 96 equispaced teeth 2A, and near its periphery with a similar number of equispaced holes 5, the distance between any pair of teeth 2A or holes 5 representing a time interval of fifteen minutes during rotation of said disc 2. The teeth 2A and holes 5 serve to locate and fix respectively on the discs 2 any desired number of trips 6, these latter being formed with dowels 3 for location in the teeth 2A, and being bolted on to the discs 2 through the said holes 5. The trips 6 are of four different kinds, as shown at 6A, 6B, 6C and 6D, the purpose of which will be made apparent hereafter.

Secured on a 30 minute shaft 7 rotatably mounted in the side plates 1 are four cam discs 8 each formed with 6 equispaced 5-minute cams 9 (Figs. 1 and 5). The 30-minute shaft 7, as its name implies, is adapted to be rotated once every 30 minutes whilst the rotation of the cam discs 8 thereon provides a time interval of 5 minutes during movement of any one cam 9 thereon past a given point.

A further shaft 10 mounted in the side plates 1 has rotatably mounted thereon four bent impulse lever assemblies 11, 12, 13, 14 (Figs. 1 and 5) the upper ends of which will be referred to as the follower ends and the lower ends of which will be referred to as the actuating ends. The lever 11 actuates the horizontal shift mechanism; lever 12 actuates the vertical lift mechanism; lever 13 actuates the ribbon colour-change mechanism; and lever 14 actuates the bias setting mechanism for the ribbon colour-change, that is, mechanism whereby the ribbon colour-change can be effected at time intervals other than those which can be provided with the said ribbon colour-change mechanism. Alternatively, where a bias setting for the ribbon colour change is not required the lever 14 may be employed to actuate a signalling device or other mechanism not forming a specific part of the time recorder mechanism.

The upper extremities of impulse levers 11, 12, 13, 14 are connected to the ends of tension springs 15 the other ends of which are mounted on a pin 4 secured to a side plate 1. The follower ends of the impulse levers 11, 12, 13, 14 are formed respectively with lugs 11A, 12A, 13A, 14A bent laterally therefrom (Fig. 5) and adapted to engage with the cams 9 of the respective cam disc 8.

The lower end of lever 11 has pivotally mounted thereon a pawl 16 urged, by means of a tension spring 17 secured between one end thereof and the body of the lever 11, into engagement with a toothed wheel 18 which actuates the horizontal shift mechanism (not shown) of the recorder. A further pawl 19 mounted on a spindle 20 secured to the side plate 1 is pivoted into engagement with the wheel 18 by means of a tension spring 21 secured thereto at one end and at the other end to a pin 22 mounted in the side plate 1, thereby assuring unidirectional rotation of the wheel 18.

The lower end of the lever 12 is, similarly to the lever 11, provided with a pawl 23, urged by a tension spring 24 into engagement with a toothed wheel 25 against which a further pawl 26 is urged by spring 27 on a pin 28 in the side frame 1, so as to ensure unidirectional rotation of the wheel 25 which actuates the vertical lift mechanism (not shown).

The upper portions of the impulse levers 11, 12, 13, 14 are provided with outwardly bent lugs 11B, 12B, 13B, 14B respectively which are adapted to be engaged by latch recesses 29C, 30C, 31C, 32C formed respectively at the ends of four latch levers 29, 30, 31, 32 (Fig. 7). The said latch levers are pivotally mounted intermediate their ends, on a shaft 33 mounted in the side plates 1. Also pivotally mounted on the shaft 33 are four latch release levers 34, 35, 36, 37 (Fig. 7) which co-operate respectively with the said latch levers 29, 30, 31 and 32. Each latch lever is arranged scissor-wise with its corresponding latch release lever and the short ends thereof are urged apart by compression springs 38 mounted on a screw 39 which extends through a hole formed in outwardly turned lugs 40, 41 formed respectively at the extremities of the short ends of the latch lever and the latch release lever. The head of each screw bears against the outer face of the lug 40, and a nut 42 bears on the outer face of each lug 41, the nuts 42 being adjusted on screws 39 so as to limit the maximum angle between the ends of each latch lever and latch release lever, whilst the screws 39 can pass through the holes in the lugs 40, 41 when the ends of the said levers are brought together against the action of the compression springs 38. Each latch lever and latch release lever assembly is returned to its engaged position with latch 14B by means of a tension spring 43 secured at one end thereto and at its other end to a pin 44 secured to the side plate 1. Each latch release lever is formed at its free end with a sear 45 which is adapted to engage with the trip members 6 as the discs 2 rotate.

Each latch lever and its corresponding latch release lever are preferably mounted to pivot freely on a bush 47 which is mounted on the said shaft 33.

The actuating ends of the levers 13, 14 have pivotally mounted on the extremities thereof pawls 48, 49 respectively (Fig. 4), the pawls 48, 49 being urged to fold against the levers 13, 14 by tension springs 50 (Figs. 1 and 2) secured at one end to the said pawls and at the other end to the said levers. The tips of the pawls 48, 49 are formed with recesses 48A, 49A in one edge of each respectively and recesses 48B, 49B in the other edge thereof.

Mounted in the upper portion of the side plates 1 and extending at either side therefrom is a shaft 51 and pivotally mounted on bushes 52 on each end of said shaft 51 are ribbon side frames 53, the said side frames being connected by a transverse bar 54 secured to flanges 55 on each of said side frames 53. Secured to each of the side frames 53 are two lift pins 56, 57 which extend from the face of the side frames remote from the side plates 1. At its free end each side frame is formed with an outwardly extending flange 58 on which is secured a shouldered pin 59 on which latter a ribbon guide roller 60 is rotatably mounted.

Below the flange 55 each ribbon side frame 53 is formed with a further flange 61. A ribbon reverse lever 62 is pivotally mounted between the flanges 55 and 61 so as to pivot laterally of the ribbon side frame 53. Each ribbon reverse lever 62 is formed with a vertical slot 63 at its free end for the passage of an inked ribbon therethrough.

Mounted externally of the release lever 62 and ribbon side frame 53 as shown in Fig. 1 is a retaining pawl 64 pivotally mounted on a spindle 65 secured in the side plate 1. The upper end of the pawl 64 has secured thereto one end of a tension spring 66 the other end of which is secured to the flange 55 of the ribbon side frame 53, the pawl 64 thus being urged to pivot anti-clockwise about spindle 65. The lower end of the pawl 64 is formed with a latch recess 67. The pawl 64 is also provided with an outwardly extending pin 68 the end of which is of D-section, as shown.

Each side plate 1 has extending outwardly therefrom a spindle 69 on which a ribbon spool 70 is adapted to be mounted, the ribbon 71 passing from one spool 70, over the end of shaft 51, around the ribbon guide roller 60, through slot 63 in lever 62, across to the other side plate 1, and then by way of a similar slot and guide roller at the other side of the apparatus on to a further ribbon spool mounted similarly to the first said spool.

The operation of the program mechanism described above is as follows:

The driving mechanism of the apparatus may be a synchronous motor or other device giving an impulse at intervals of, say, one minute. The drive is taken through a time magnet and ratchet gear (not shown) to the 30-minute shaft 7 and from thence to a gear train driving a common shaft, rotating once in 24 hours, on which are mounted the program discs 2.

The follower ends of levers 11, 12, 13, 14 when inoperative are engaged by the cams 9 on cam disc 8 when the cams 9 are in the fourth minute of their five minute movement past the lugs 11A, 12A, 13A, 14A, it being understood, as previously stated, that the movement of any cam 9 past a given point occupies a period of 5 minutes. Thus, each of the said levers 11, 12, 13, 14 will be pivoted slightly anti-clockwise, providing a slight clearance between the latch recesses 29C, 30C, 31C, and 32C of latch levers 29, 30, 31, 32, and the lugs 11B, 12B, 13B, 14B of the said levers 11, 12, 13, 14. Disengagement of the said latch recesses and lugs is prevented by springs 43 which urge the latch levers 29, 30, 31, 32 and their respective latch release levers 34, 35, 36, 37 in a clockwise direction.

The release of the said latch levers from the follower ends of levers 11, 12, 13, 14 is effected by contact of the sears 45 with the trips 6 on the program discs 2 as shown in Fig. 2. The trips 6 are arranged in four sets, one on either side of the inner disc 2 and one on either side of the outer disc 2, each set coacting with one of the latch release levers 34, 35, 36, 37. For the sake of convenience the operation of each of levers 11, 12, 13, 14 by the trips 6 will now be considered separately.

As before stated, the trips 6 are of four types, A, B, C, and D and are arranged at intervals on the discs 2 which given an available time interval of 15 minutes during which a trip may be operative, a period during which three 5-minute cams 9 will have rotated past a given point.

If a type A trip engages the sear 45 of latch release lever 34 then the lever 34 pivots anti-clockwise, compressing spring 38, as the sear 45 passes over the contoured end of trip 6A. It will be noted that the highest point on the end of the trip 6A is at its centre, corresponding to the second five minutes of its 15-minute period of engagement. In the minute prior to this 5-minute period a cam 9 will have moved the follower end of lever 11 sufficiently anti-clockwise to disengage latch recess 29C from lug 11B. Thus, at the beginning of the said second 5-minute period of engagement of trip 6A with sear 45 the movement stored up in spring 38 will be released and latch lever 29 will pivot anticlockwise releasing the follower end of lever 11. The cam 9 will now just have cleared the lug 11A and the lever 11, under the action of spring 15, will pivot clockwise until it rests against the lowest edge of the next cam 9, such clockwise movement imparting an impulse to the type wheel 18 of the shift mechanism by means of the pawl 16 on the actuating end of lever 11. The sear 45 has now passed over the outermost edge of trip 6A and during further rotation of the trip the latch release lever 34 and latch lever 29 pivot clockwise; the latch recess 29C re-engaging with lug 11B as lug 11A rises on the cam 9 and pivots the follower end of lever 11 anti-clockwise.

Thus with a type A trip the lever 11 (or 12, 13, or 14) moves clockwise once, at the start of the second 5 minutes of the 15-minute period governed by the trip, and is re-latched against further operative movement at the end of such 5-minute period.

It will be understood that with the type B trip 6 shown in Fig. 1 the latch release lever 34 will be raised and the lever 11 released for operation during the final 5 minutes of the respective 15-minute period. Alternatively, by reversing the type B trip operation of the lever 11 will take place in the first 5 minutes of the 15-minute period.

A type C trip (as shown operating in Fig. 2) will effect raising of the latch release lever 34 during the whole of the 15-minute period so that the lever 11 will make three operating movements as it is raised and released by three of the 5-minute cams 9.

A type D trip (in the position shown in Fig. 1) will effect operation of lever 11 during the first 10 minutes of the 15-minute period i. e. the lever 11 will make two operating movements; alternatively, by reversing the trip, such movements may be made in the final 10 minutes of the 15-minute period.

It will be seen, therefore, that by selection and disposition of the trips 6 on the discs 2, impulses may be imparted to the type wheel 18 and the horizontal shift mechanism associated therewith by the lever 11 during any 5-minute period of the rotation of the discs 2 and for a maximum period of 15 minutes (corresponding to three impulses by the lever 11) in respect to each trip.

It will be appreciated that the actuation of the other levers 12, 13 and 14 is effected in the same way by the other sets of trips on the discs 2 and the latch levers 30, 31, 32 and latch release levers 35, 36 and 37 co-acting therewith. Thus, by suitable arrangement of the trips 6 on the side of the inner disc 2 remote from the side plate 1 impulses may be imparted by the lever 12 to the wheel 25, and the vertical lift mechanism associated therewith, at any 5-minute period in the day, or for any number of successive 5-minute periods, a type C trip affording a maximum of three impulses.

The operation of the levers 13 and 14, which actuate the ribbon shift mechanism and the ribbon bias shift mechanism respectively, and which are controlled by the two sets of trips 6 on the outer disc 2, will now be considered.

It will be assumed that the parts are in the position shown in Fig. 1. The operation and the construction of the levers 13 and 14 are similar and in viewing Figs. 1, 2, 3 and 4, the lever shown may be regarded indifferently, merely from the point of view of the operation thereof, as either 13 or 14. (Both levers 13 and 14 are shown in Fig. 2.)

When a trip 6 on the disc 2 engages with the sear 45 on latch release lever 37 the latch recess 32C of latch lever 32 will be released from engagement by the lug 14B on lever 14, in the manner previously described in relation to levers 11 and 12. The latch lever 32 will then pivot anti-clockwise into the position shown in Fig. 3 whilst the lug 14A of the follower end of lever 14, having cleared the tip of one cam 9 pivots clockwise carrying with it the ribbon control pawl 49. The pin 56 on the ribbon side frame 53 is engaged by the recess 49B on control pawl 49 and is lifted by the said pawl, the ribbon side frame accordingly pivoting anti-clockwise about the shaft 51, the ribbon 71 carried thereon being raised so as to cause the, for example, red-inked portion of the ribbon to occupy the place formerly occupied by the black-inked portion thereof. During this movement the pin 57 on the ribbon side frame 53 rides on the lower edge of the pawl 64 which is urged in contact therewith by spring 66, and then engages in the recess 67 therein. The parts are now in the position shown in Fig. 3.

In the next 5-minute period a further cam 9 moves past the lug 14A, pivoting the lever 14 anti-clockwise. The ribbon control pawl 49 now moves downwardly and to the left, disengaging the pin 56 from the recess 49B, the ribbon side frame during this movement being maintained in its previous position by pin 57 engaged in recess 67.

At the end of its downward movement the recess 49A on pawl 49 engages with the D-pin 68.

On the next actuations of lever 14 by a cam 9 the lever 14 moves upwardly and to the right, thus causing pawl 64 to pivot clockwise about pin 65, pawl 49 being engaged by its recess 49A with the D-pin 68. The clockwise movement of pawl 64 disengages pin 57 from recess 67 in pawl 64 and the side frame 53 is thus freed and pivots clockwise under gravity and the action of spring 66, the ribbon 71 carried thereby being lowered to its original position. The parts are now in the position shown in Fig. 4.

During the foregoing operation pawl 48 remains inoperative with respect to pins 56 and 68, so that the operation of raising the ribbon side frame 53 may be effected by, say pawl 49 and the return of the side frame to its lowered position be effected by pawl 48, or vice versa.

In order to provide a bias setting for the ribbon colour-change mechanism, i. e. operation thereof at any odd minute past any hour rather than during the five minute periods normally provided for, the following modifications are provided:

The five minute cam 9 co-operating with lever 14 (or 13) is rotated on shaft 7 by an amount corresponding to a period of 1, 2 or 3 minutes past its normal setting. The latch release lever 37 must now be lengthened in order that it may be actuated by the trips 6 at a corresponding period before or after the 5, 10 or 15-minute intervals provided by the trips in normal use. This is conveniently effected in the following manner, as shown in Fig. 6.

The latch release lever 37 is formed of two parts 37A, 37B, secured by bolts 73, 37B being slotted as at 74 so as to permit limited longitudinal displacement thereof relative to 37A. An eccentric screw 75 extends through openings in members 37A and 37B, the screw 75 having the portion of its shank extending through the hole in 37B eccentric to the threaded portion thereof extending through 37A. Thus, on rotating the eccentric screw 75 the member 37A moves longitudinally with respect to 37B, the bolts 73 being slackened during such operation and thereafter tightened.

I claim:

1. In a time recorder having program mechanisms, means for setting and operating the program mechanisms comprising a plurality of discs adapted to be rotated at a constant speed and arranged to carry sets of trips, a series of impulse levers one end of each of which constitutes an actuating member for imparting impulses to a program mechanism and the other end of which constitutes a cam follower, an annular series of cams for each impulse lever and rotatable around the axis thereof in timed relationship with said discs and engageable successively with the follower ends of the respective impulse levers to actuate them to impart impulses to the respective program mechanisms by the actuating ends of said impulse levers, and latch members for holding the respective impulse levers out of contact with the respective series of cams but engageable and actuated by said trips on rotation of the discs to release said impulse levers for actuation by said cams to operate the respective program mechanisms, each series of cams being provided for each impulse lever, latch member and set of trips, and the trips on the discs and the cams for each impulse lever being so positioned relatively that the intervals between the trips of each set correspond to intervals of time which are multiples of the periods of time corresponding to the intervals between the successive cams for the respective set of trips.

2. A time recorder as defined in claim 1, wherein the portions of the trips of each set which engage the respective latch members are of relatively different contours so as to vary the periods of time during which the respective impulse levers may be released for actuation by the respective cams.

3. A time recorder as defined in claim 1, wherein said trips are spaced around the peripheries of the discs at intervals corresponding, during rotation of the discs, to the intervals of time during successive operations of the respective program mechanisms.

4. In a time recorder of the type having program mechanisms for respectively shifting a record card horizontally and vertically for printing a time record on different areas thereof, program mechanism for shifting an inking ribbon to print in different colors on the record card, and mechanism for bias setting the ribbon shifting mechanism, means for setting and operating said mechanisms comprising a set of impulse levers mounted intermediately of their ends for pivotal movements on a common axis, one end of each lever constituting a follower member and the other end thereof constituting an actuating member for the respective mechanism, a plurality of discs adapted to be rotated at a constant speed and carrying sets of trips, sets of annularly spaced cams for the impulse levers rotatable around a common axis in timed relation with said discs and engageable successively with the follower ends of the respective impulse levers to impart impulses to the respective mechanisms by the actuating ends of said levers, a set of latch members cooperative respectively with the impulse levers to hold them in inoperative relation with their respective cams, and a release lever for each latch member engageable by the respective set of trips to release the corresponding latch member, each set of cams being provided for each impulse lever, latch member and set of trips, and the trips on the discs and the cams for each impulse lever being so positioned relatively that the intervals between the trips of each set correspond to intervals of time which are multiples of the periods of time corresponding to the intervals between the successive cams for the respective set of trips, and the actuating end of one impulse lever being operative to impart impulses to the horizontal card shifting mechanism, the actuating end of a second impulse lever being operative to impart impulses to the vertical card shifting mechanism, the actuating end of a third impulse lever being operative to impart an impulse to the ribbon shifting mechanism, and the actuating end of a fourth impulse lever being operative to impart an impulse to the bias setting mechanism for the ribbon shifting mechanism.

5. A time recorder as defined in claim 4, including a pawl pivotally mounted on the actuating end of the first said impulse lever, and a ratchet wheel forming part of said horizontal card shifting mechanism, said pawl on the first said impulse lever being operative by pivotal movement of the first said impulse lever to impart impulses to said ratchet wheel to actuate said horizontal card shitfing mechanism.

6. A time recorder as defined in claim 4, including a pawl pivotally mounted on the actuating end of the second said impulse lever, and a ratchet wheel forming part of said vertical card shifting mechanism, said pawl on the second said impulse lever being operative by pivotal movement of the second said impulse lever to impart impulses to said ratchet wheel to actuate said vertical card shifting mechanism.

7. A time recorder as defined in claim 4, including a pawl pivotally mounted on the actuating end of the third said impulse lever, and wherein said ribbon shifting mechanism comprises a pivoted frame carrying the ribbon and operable by said pawl on the third said impulse lever, said pawl on the third said impulse lever being operative by pivotal movement of the third said impulse lever to impart movement to said frame on its pivot to raise or lower the ribbon carried thereby.

8. A time recorder as defined in claim 4, including a pawl pivotally mounted on the third said impulse lever, and a pawl pivotally mounted on the fourth said impulse lever, and wherein said ribbon shifting mechanism comprises a pivoted frame carrying the ribbon, said pawl on the third said impulse lever being operative by pivotal movement of the third said impulse lever by its cam to impart movement to said frame on its pivot to raise or lower the ribbon carried thereby, the cam which actuates the fourth said impulse lever acting out of synchronism with the cam which actuates the third said impulse lever, and a latch for holding the ribbon carrying frame in its raised position and actuated by the pawl on the fourth said impulse lever to trip the ribbon carrying frame for movement to its lower position.

9. A time recorder as defined in claim 4, including a pawl pivotally mounted on the third said impulse lever, and a pawl pivotally mounted on the fourth said impulse lever, and wherein said ribbon shifting mechanism comprises a pivoted frame carrying the ribbon, said pawl on the third said impulse lever being operative by pivotal movement of the third said impulse lever by its cam to impart movement to said frame on its pivot to raise or lower the ribbon carried thereby, the cam which actuates the fourth said impulse lever acting out of synchronism with the cam which actuates the third said impulse lever, said ribbon carrying frame having a pin thereon, and a latch cooperative with said pin as the ribbon carrying frame is raised to hold said frame in raised position and releasable from said pin by the pawl on the fourth said impulse lever upon the actuation thereof to trip the ribbon carrying frame for movement to its lowered position.

References Cited in the file of this patent

UNITED STATES PATENTS

| Number | Name | Date |
|---|---|---|
| 908,976 | Dey | Jan. 5, 1909 |
| 1,513,368 | Bryce | Oct. 28, 1924 |
| 1,761,529 | Long | June 3, 1930 |
| 1,891,960 | Streckfuss | Dec. 27, 1932 |
| 2,171,167 | Streckfuss | Aug. 29, 1939 |
| 2,310,389 | Blakely | Feb. 9, 1943 |